(12) United States Patent
Park et al.

(10) Patent No.: US 10,162,508 B2
(45) Date of Patent: Dec. 25, 2018

(54) CONTENT ITEMS STORED IN ELECTRONIC DEVICES

(71) Applicant: Samsung Electronics Co., Ltd., Gyeonggi-do (KR)

(72) Inventors: Chan-Pyo Park, Seoul (KR); Sung-Jin Choi, Gyeonggi-do (KR); Ik-Han Kim, Seoul (KR); Young-Keun Yun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 351 days.

(21) Appl. No.: 14/300,603

(22) Filed: Jun. 10, 2014

(65) Prior Publication Data

US 2015/0067524 A1     Mar. 5, 2015

Related U.S. Application Data

(60) Provisional application No. 61/873,483, filed on Sep. 4, 2013.

(30) Foreign Application Priority Data

Nov. 12, 2013    (KR) ........................ 10-2013-0136690

(51) Int. Cl.
*G06F 3/14*       (2006.01)
*G06F 3/0486*    (2013.01)
*G06F 3/0488*    (2013.01)
*G06F 21/10*     (2013.01)

(52) U.S. Cl.
CPC .......... *G06F 3/0486* (2013.01); *G06F 3/0488* (2013.01); *G06F 21/10* (2013.01)

(58) Field of Classification Search
CPC ................................... G06F 3/14; G06F 3/17
USPC ............... 715/738; 709/203; 358/1.15, 1.14; 463/42; 707/204
See application file for complete search history.

(56) References Cited

U.S. PATENT DOCUMENTS

| | | | |
|---|---|---|---|
| 9,390,052 B1 * | 7/2016 | Parakh | G06F 15/167 |
| 2007/0266062 A1 * | 11/2007 | Young | G06F 11/1004 |
| 2009/0082110 A1 * | 3/2009 | Relyea | G07F 17/32 463/42 |
| 2010/0208295 A1 * | 8/2010 | Sato | G06F 3/1285 358/1.15 |
| 2013/0144847 A1 | 6/2013 | Spurlock | |
| 2013/0144883 A1 | 6/2013 | Shin et al. | |
| 2013/0188212 A1 * | 7/2013 | Pardhan | H04N 1/00222 358/1.14 |
| 2013/0191414 A1 | 7/2013 | Srivastava et al. | |
| 2014/0012894 A1 * | 1/2014 | Yasuma | H04L 67/42 709/203 |

FOREIGN PATENT DOCUMENTS

KR    10-2013-0065873 A    6/2013
KR    10-2013-0086005 A    7/2013

* cited by examiner

*Primary Examiner* — Ruay Ho
(74) *Attorney, Agent, or Firm* — Cha & Reiter, LLC

(57) ABSTRACT

The present disclosure provides a portable terminal and a method for managing content stored in a plurality of devices. The method includes displaying information associated with a plurality of electronic devices registered under a user identifier; searching content items stored across the plurality of electronic devices; and displaying content items found across the plurality of electronic devices.

28 Claims, 12 Drawing Sheets

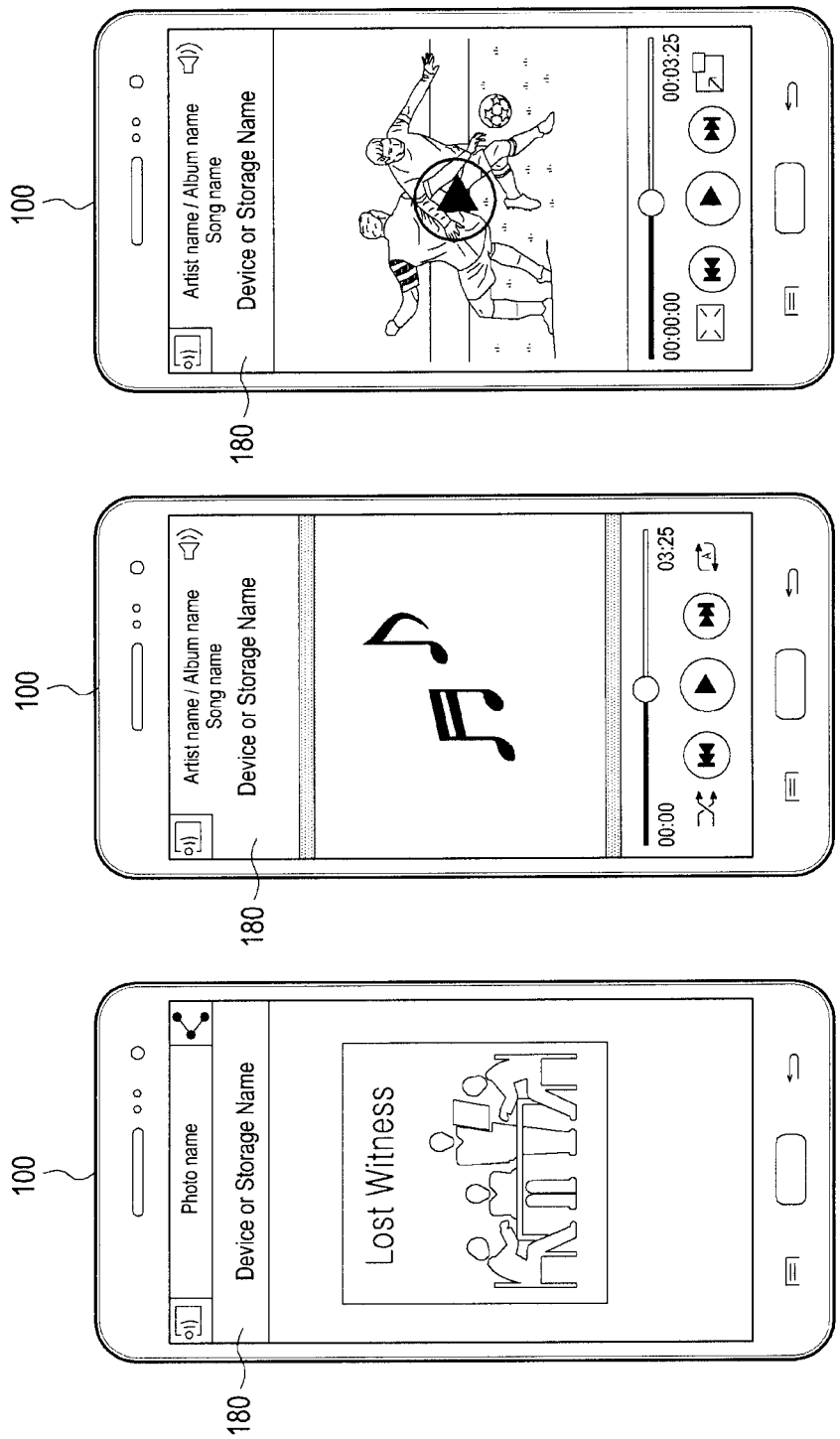

CONTENT ITEMS STORED IN ELECTRONIC DEVICES

CROSS-REFERENCE TO RELATED APPLICATION(S)

This application claims the benefit under 35 U.S.C. § 119(a) of a U.S. Provisional Application filed in the USPTO on Sep. 4, 2013 and assigned Ser. No. 61/873,483 and a Korean patent application filed in the Korean Intellectual Property Office on Nov. 12, 2013 and assigned Serial No. 10-2013-0136690, the entire disclosures of which are incorporated herein by reference.

TECHNICAL FIELD

The present disclosure relates to integrally or collectively managing content in a mobile terminal.

BACKGROUND

While the spread of mobile devices has increased rapidly in recent years, there has been an increasing trend toward the use of personal computers (PC) in conjunction with mobile devices. The PCs and mobile devices may also be used together with a cloud server. In view of this pattern, there has been a growing demand for technology capable of managing content stored in various electronic devices.

Conventional solutions may store content in various electronic devices but may not integrate or display the content in one portable terminal. Thus, conventional techniques may not permit the scattered content to be centrally managed. Moreover, conventional techniques may display redundant content repeatedly. In addition, conventional techniques may not be able to search for content scattered among different electronic devices.

SUMMARY

In view of the foregoing, the present disclosure addresses at least some of the above-mentioned problems and/or disadvantages. Accordingly, disclosed herein are a portable terminal for integrally displaying content items stored in different electronic devices and a method for controlling the portable terminal.

Another aspect of the present disclosure provides a portable terminal and method for displaying and managing redundantly distributed content items such that a user may conveniently and effectively manage their content.

Another aspect of the present disclosure provides a portable terminal and method for simultaneously searching content items stored in different electronic devices of a user by using a keyword.

The technical problems of the present disclosure are not limited to the foregoing problems, and other technical problems will be clearly understood by those of ordinary skill in the art from the following description.

In one aspect of the present disclosure, a method for integrally managing content items is provided. The method may comprise displaying information associated with a plurality of electronic devices registered under a user identifier; searching for content items stored across the plurality of electronic devices; and displaying content items found across the plurality of electronic devices.

In another aspect of the present disclosure, a portable terminal for integrally managing content items is provided. The portable terminal may include a controller to: display, on a touch screen, information associated with a plurality of electronic devices registered under a user identifier; search for content items stored across the plurality of electronic devices; and display content items found across the plurality of electronic devices.

Other aspects, advantages, and salient features of the disclosure will become apparent to those skilled in the art from the following detailed description and drawings.

BRIEF DESCRIPTION OF THE DRAWINGS

The above and other features and advantages of the present disclosure will be more apparent from the following detailed description taken in conjunction with the accompanying drawings, in which:

FIG. 11A, FIG. 11B and FIG. 11C are further working example of content being executed in a portable terminal in accordance with aspects of the present disclosure.

Throughout the drawings, like reference numerals will be understood to refer to like parts, components, and structures.

DETAILED DESCRIPTION

Figure 1:
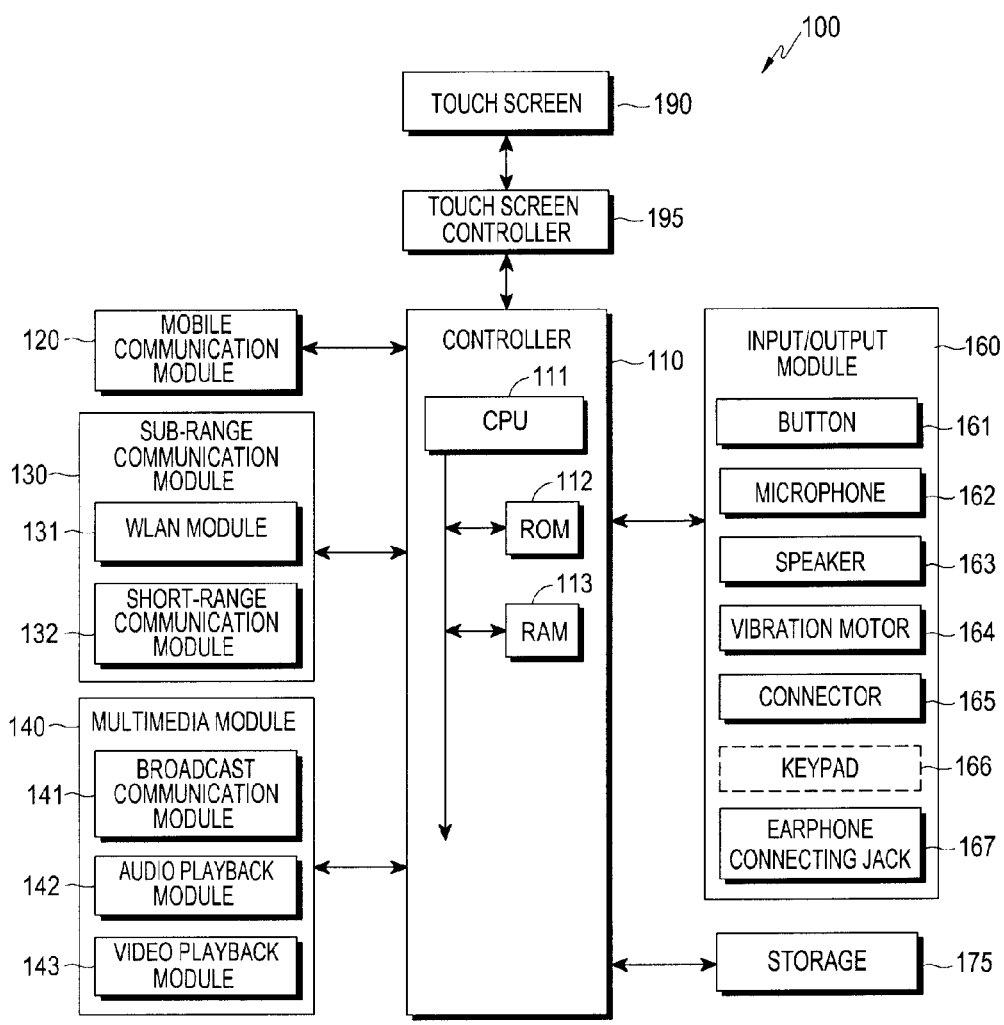
FIG. 1 is a schematic block diagram illustrating an example portable terminal in accordance with aspects of the present disclosure.

Various examples of the present disclosure may be changed or implemented in a variety of ways. Particular examples have been illustrated in the drawings and a related detailed description thereof will be provided below. However, this is not intended to limit the present disclosure. It is understood that all changes, equivalents, or substitutes are included within the spirit and scope of the present disclosure.

Although ordinal numbers such as "first," "second," and so forth will be used to describe various components of the present disclosure, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing an example only and is not intended to be limiting. As used herein, the singular forms are intended to include the plural forms as well, unless the context clearly indicates otherwise. It will be further understood that the terms "comprises" and/or "has" when used in this specification, specify the presence of a stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, unless otherwise indicated the terms are differently defined. It should be understood that terms defined in a generally-used dictionary have meanings coinciding with those of terms in the related technology unless otherwise indicated.

A user device may include, but is not limited to, a smartphone. That is, the user device may include a device such as a Personal Computer (PC) or a smart Television (TV). The following description will be described with an example in which the user device is a smartphone.

Referring to FIG. 1, a schematic block diagram illustrating an example mobile device is shown. In FIG. 1, a portable terminal 100 may be connected with an external electronic device (not illustrated) by using at least one of a mobile communication module 120, a connector 165, and an earphone connecting jack 167. The "external device" may include one of various devices which are removable from the portable terminal 100 and are connectible with the external device in a wired manner, such as, for example, an earphone, an external speaker, a Universal Serial Bus (USB) memory, a charging device, a cradle, a docking station, a Digital Multimedia Broadcasting (DMB) antenna, a mobile payment-related device, a health management device (a blood pressure monitor or the like), a game console, a vehicle navigation device, and so forth. The "external device" may include a wirelessly connectible Bluetooth communication device, a Near Field Communication (NFC) device, a Wi-Fi Direct communication device, and a wireless Access Point (AP). The portable terminal 100 may be connected with another portable terminal or electronic device such as, for example, one of a cellular phone, a smart phone, a tablet Personal Computer (PC), a desktop PC, and a server, in a wired or wireless manner.

Referring to FIG. 1, the portable terminal 100 includes a display 190 and a display controller 195. The portable terminal 100 also includes a controller 110, the mobile communication module 120, a sub-communication module 130, a multimedia module 140, an input/output module 160, and a storage 175. The sub-communication module 130 includes at least one of a Wireless Local Area Network (WLAN) module 131 and a short-range communication module 132. The multimedia module 140 includes at least one of a broadcast communication module 141, an audio playback module 142, and a video playback module 143. The input/output module 160 includes at least one of buttons 161, a microphone 162, a speaker 163, a vibration motor 164, a connector 165, and a keypad 166. The following description will be made based on an example where the display 190 and the display controller 195 are a touch screen and a touch screen controller, respectively.

The controller 110 controls a Central Processing Unit (CPU) 111, a Read Only Memory (ROM) 112 in which a control program for controlling the portable terminal 100 is stored, and a Random Access Memory (RAM) 113 which memorizes a signal or data input from the portable terminal 100 or is used as a memory region for a task performed in the portable terminal 100. The CPU 111 may include a single core, a dual core, a triple core, or a quad core processor. The CPU 111, the ROM 112, and the RAM 113 may be interconnected through an internal bus.

The controller 110 controls the mobile communication module 120, the sub-communication module 130, the multimedia module 140, the input/output module 160, the storage 175, the touch screen 190, and the touch screen controller 195.

The mobile communication module 120 may facilitate the connection between the portable terminal 100 and an external device through mobile communication by using one or more antennas (not illustrated) under control of the controller 110. The mobile communication module 120 transmits/receives a wireless signal for a voice call, a video call, a text message (Short Messaging Service: SMS), and/or a multimedia message (Multimedia Messaging Service: MMS) with a cellular phone (not illustrated), a smart phone (not illustrated), a tablet PC, or another electronic device (not illustrated) which has a phone number input into the portable terminal 100.

The sub-communication module 130 includes at least one of the WLAN module 131 and the short-range communication module 132. Alternatively, the sub communication module 130 may include either the WLAN module 131 or the short-range communication module 132, or both.

The WLAN module 131 may be connected to the Internet in a place where a wireless AP (not illustrated) is installed, under control of the controller 110. The WLAN module 131 supports the wireless LAN standard IEEE802.11x of the Institute of Electrical and Electronics Engineers (IEEE). The short-range communication module 132 may wirelessly perform short-range communication between the portable terminal 100 and an external electronic device under control of the controller 110. The short-range communication may include Bluetooth, infrared data association (IrDA), WiFi-Direct communication, Near Field Communication (NFC) communication, or the like.

The portable terminal 100 may include at least one of the mobile communication module 120, the WLAN module 131, and the short-range communication module 132, depending on its capability. For example, the portable terminal 100 may include a combination of the mobile communication module 120, the WLAN module 131, and the short-range communication module 132, depending on its capability.

The multimedia module 140 includes the broadcast communication module 141, the audio playback module 142, or the video playback module 143. The broadcast communication module 141 receives a broadcast signal (for example, a TV broadcast signal, a radio broadcast signal, or a data broadcast signal) and broadcast additional information (for example, Electric Program Guide (EPG) or Electric Service Guide (ESG)) transmitted from a broadcasting station (not shown) via a broadcast communication antenna (not illustrated) under control of the controller 110. The audio playback module 142 may play a digital audio file (for example, a file having a file extension such as 'mp3', 'wma', 'ogg', or 'wav') stored in the storage 175 or received under control of the controller 110. The video playback module 143 may play a digital video file (for example, a file having a file extension such as 'mpeg', 'mpg', 'mp4', 'avi', 'mov', or 'mkv') stored or received under control of the controller 110.

The multimedia module 140 may include the audio playback module 142 and the video playback module 143 except for the broadcast communication module 141. The audio playback module 142 or the video playback module 143 of the multimedia module 140 may be included in the controller 110.

The input/output module 160 includes at least one of the plurality of buttons 161, the microphone 162, the speaker 163, the vibration motor 164, the connector 165, and the keypad 166.

The buttons 161 may be formed on at least one of a front surface, a side surface, and a rear surface of a housing (or case) of the portable terminal 100, and may include at least one of a power/lock button, a volume button, a menu button, a home button, a back button, and a search button.

The microphone 162 receives voice or sound and generates a corresponding electric signal under control of the controller 110.

The speaker 163 outputs sound corresponding to various signals or data (for example, wireless data, broadcast data, digital audio data, digital video data, or the like) under control of the controller 110. The speaker 163 may output sound corresponding to a function executed by the portable terminal 100 (for example, button manipulation sound corresponding to a phone call, a ring back tone, or voice of a counterpart user). One or more speakers 163 may be formed in a proper position or proper positions of the housing of the portable terminal 100.

The vibration motor 164 converts an electric signal into mechanical vibration under control of the controller 110. For example, in the portable terminal 100, in a vibration mode, if a voice call or a video call from another device (not illustrated) is received, the vibration motor 164 operates. One or more of the vibration motor 164 may be disposed in the housing of the portable terminal 100. The vibration motor 164 may operate in response to a user's touch on the touch screen 190 and continuous movement of a touch on the touch screen 190.

The connector 165 may be used as an interface for connecting the portable terminal 100 with an external device (not illustrated) or a power source (not illustrated). Under control of the controller 110, data stored in the storage 175 of the portable terminal 100 may be transmitted to an external electronic device or data may be received from the external electronic device through a wired cable connected to the connector 165. The external device may be a docking station and the data may be an input signal delivered from an external input device such as a mouse or a keyboard. The portable terminal 100 receives power from the power source through the wired cable connected to the connector 165 or may charge a battery (not illustrated) by using the power source.

The keypad 166 receives key input from the user for control of the portable terminal 100. The keypad 166 includes a physical keypad (not illustrated) formed in the portable terminal 100 or a virtual keypad (not illustrated) displayed on the touch screen 190. The physical keypad (not illustrated) formed in the portable terminal 100 may be excluded according to the capability or structure of the portable terminal 100.

An earphone (not illustrated) may be inserted into the earphone connecting jack 167 to be connected to the portable terminal 100.

The storage 175 stores a signal or data which is input/output corresponding to operations of the mobile communication module 120, the multimedia module 140, the input/output module 160, or the touch screen 190, under control of the controller 110. The storage 175 may also store a control program and applications for control of the portable terminal 100 and/or the controller 110.

The term "storage" includes the storage 175, the ROM 112 and the RAM 113 in the controller 110, or a memory card (not illustrated) mounted in the portable terminal 100 (for example, a Secure Digital (SD) card, a memory stick). The storage 175 may include a non-volatile memory, a volatile memory, a Hard Disk Drive (HDD), or a Solid State Drive (SSD).

The touch screen 190 provides a user graphic interface corresponding to various services (for example, call, data transmission, broadcasting, picture taking) to users. The touch screen 190 outputs an analog signal, which corresponds to at least one input to the user graphic interface, to the touch screen controller 195. The touch screen 190 receives at least one user inputs through a user's body (for example, a finger including a thumb) or the input unit 168 (for example, a stylus pen). The touch screen 190 also receives a continuous movement of one touch (i.e., a drag input). The touch screen 190 outputs an analog signal corresponding to the received continuous movement of the touch to the touch screen controller 195.

In the present disclosure, a touch may also include a non-contact touch as well as a direct contact between the touch screen 190 and a user's body or touchable input means. A distance or interval from the touch screen 190 within which the user input means may be detected may be changed according to the capability or structure of the portable terminal 100.

The touch screen 190 may be implemented as, for example, a resistive type, a capacitive type, an infrared type, an acoustic wave type, or a combination thereof.

The touch screen controller 195 converts an analog signal received from the touch screen 190 into a digital signal (for example, X and Y coordinates) and transmits the digital signal to the controller 110. The controller 110 controls the touch screen 190 by using the digital signal received from the touch screen controller 195. For example, the controller 110 controls a shortcut icon (not illustrated) displayed on the touch screen 190 to be selected or to be executed in response to a touch. The touch screen controller 195 may be included in the controller 110.

Figure 2:
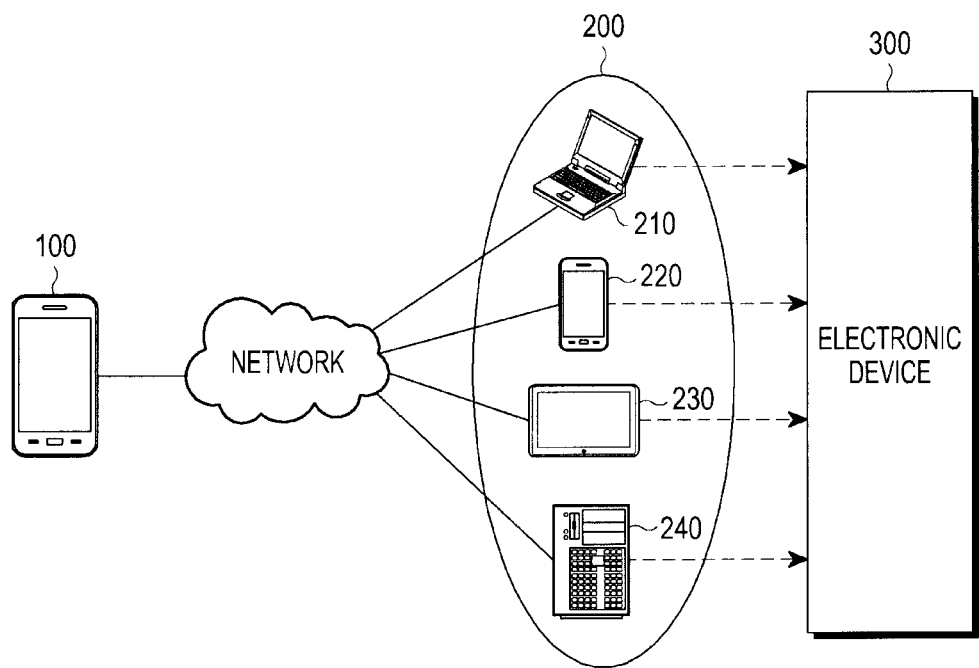
FIG. 2 is an example system for integrally managing content in a portable terminal in accordance with aspects of the present disclosure.

Referring to FIG. 2, an example system for managing content in portable terminal 100 is depicted. In FIG. 2, the example system may include the portable terminal 100, a plurality of electronic devices 200, and another electronic device 300 that receives content from electronic device 200. The portable terminal 100, the electronic devices 200, and another electronic device 300 may be connected through a predetermined network. The network may be a communication network using a method, for example, Near Field Communication (NFC), Bluetooth®, Wi-Fi, Universal Mobile Telecommunications System (UMTS)/General Packet Radio Service (GPRS), 3rd Generation (3G), Long Term Evolution (LTE), LTE-Advanced (LTE-A), Ethernet, or the like, and may be a combination of communication networks using those methods. The network may include a Local Area Network (LAN), a Metropolitan Area Network (MAN), a Wide Area Network (WAN), or the like. In one example, a network connecting some of the components may use a method that is different from that used by a network connecting the other components, or all of the components may use the same method for the network. Hereinafter, for convenience, the term "network" will be used to mean a network using any method. In one example, electronic devices 200 and electronic device 300 may be connected through the network.

The electronic devices 200 may include a user device such as a smartphone, a laptop computer, a tablet PC, or the like and a server such as a cloud server or the like. That is, the electronic devices 200 may mean devices that store predetermined data and are connected with the network for data transmission and reception. Although the electronic devices 200 and the portable terminal 100 have been described as separate concepts for convenience herein, the electronic devices 200 may include the portable terminal 100. That is, as will be described later, content items may be content items stored in the portable terminal 100 as well as content items stored in the electronic devices 200.

Figure 3:
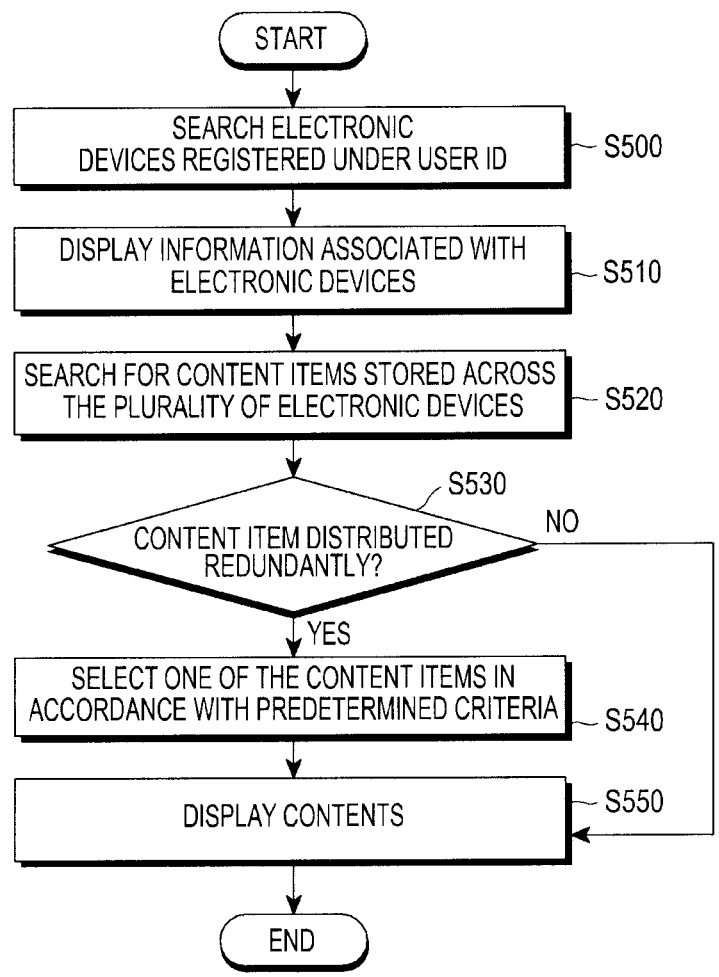
FIG. 3 is a flowchart illustrating an example method for integrally managing content in a portable terminal in accordance with aspects of the present disclosure.

Referring to FIG. 3, a flowchart of an example method for integrally managing content is shown. In FIG. 3, controller 110 of the portable terminal 100 may search the plurality of electronic devices 200 registered under a user identifier in operation S500. The search may be carried out by the sub-communication module 130. To this end, the user may register the electronic devices 200 of the user in the user identification information. The user identification information may include an ID that is set by the user, an e-mail account of the user, a phone number of the portable terminal 100 of the user, and so forth. In the specification, for convenience, a description will be made assuming that the electronic devices 200 of the user are registered under the user's e-mail account, that is, abc@samsung.com, as the user identification information. However, it is understood that the user identification information is not limited to this example. The operation of searching, for the electronic devices 200 may include accessing a server in which the e-mail account and the electronic devices 200 registered under the e-mail account are registered to search for the registered electronic devices 200.

Figure 6:
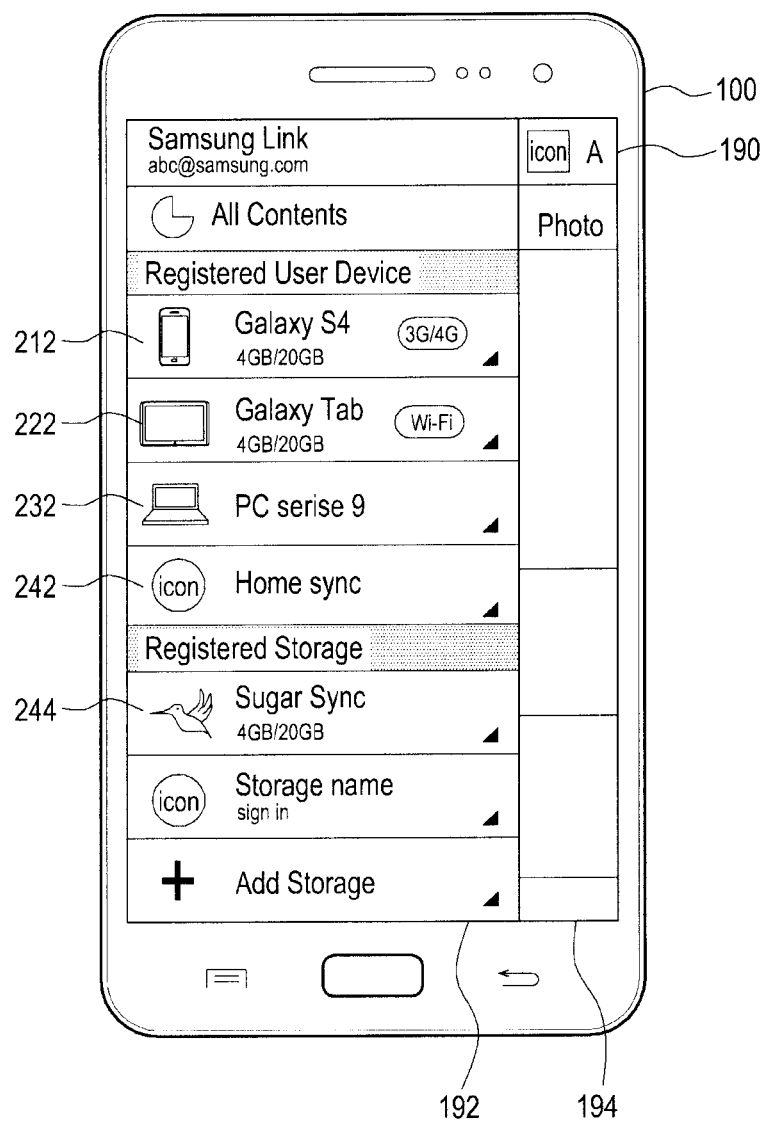
FIG. 6 is a working example of registered device information being displayed in accordance with aspects of the present disclosure.

When the plurality of electronic devices 200 are found, portable terminal 100 may display information associated with the searched plurality of electronic devices 200 on the touch screen 190 in operation S510. Referring to FIG. 6, information associated with the electronic devices 200 registered under abc@samsung.com is displayed. The user may execute a separate application to check the information associated with the electronic devices 200, and may check the information in the application. The information associated with the electronic devices 200 may be displayed separately for user devices and storage registered under the e-mail account. The information associated with the electronic devices 200 may be meta-data of the electronic devices 200. The meta-data may include at least one of icons corresponding to types of the electronic devices 200, model names of the electronic devices 200, storage capacities of the electronic devices 200, and network types supported by the electronic devices 200. The types of the electronic devices 200 may indicate whether each electronic device 200 is a smart phone, a tablet PC, and so forth. The icon corresponding to the type of the electronic device 200 may be an icon in the shape of a smart phone displayed to the left of the model name (for example, Galaxy S4) of the electronic device 200 as shown in FIG. 6. The storage capacity of the electronic device 200 (for example, 4 GB/20 GB) may be displayed. The network type supported by the electronic device 200 may mean a communication standard such as Wi-Fi. As with the information associated with each electronic device 200, a network type (communication standard) supported by each electronic device 200 may be displayed.

As illustrated in FIG. 6, the "Registered User Device" item may include a smart phone, a tablet PC, a laptop computer, a home cloud server (for example, Home Sync), or the like. A "Registered Storage" item may include a cloud server (for example, Sugar Sync). The user may register a new electronic device other than the registered electronic devices 200 by using an "Add Storage" menu.

Referring once again to the example in FIG. 6, pages displayed on the touch screen 190 may include a first page 192 and a second page 194. The portable terminal 100 displays both the first page 192 and the second page 194 at the same time, or may display only the first page 192. The user may switch from the first page 192 to the second page 194, for example, through a swipe gesture. The second page 194 may be a page on which content items stored in the electronic device 200, such as picture content, voice content, or the like are displayed.

The controller 110 searches for content items stored across the plurality of electronic devices 200 in operation S520. Each of the plurality of electronic devices 200 may include various content items. If all content types are searched, the search time may be long and a user may not wish to integrally manage all content items. Thus, in one example, specific content item types may be searched, such as media content and document (text) content. The media content may include image content, voice content, and video content. When the media content are searched for, an application such as a media scanner may be used.

Figure 7:
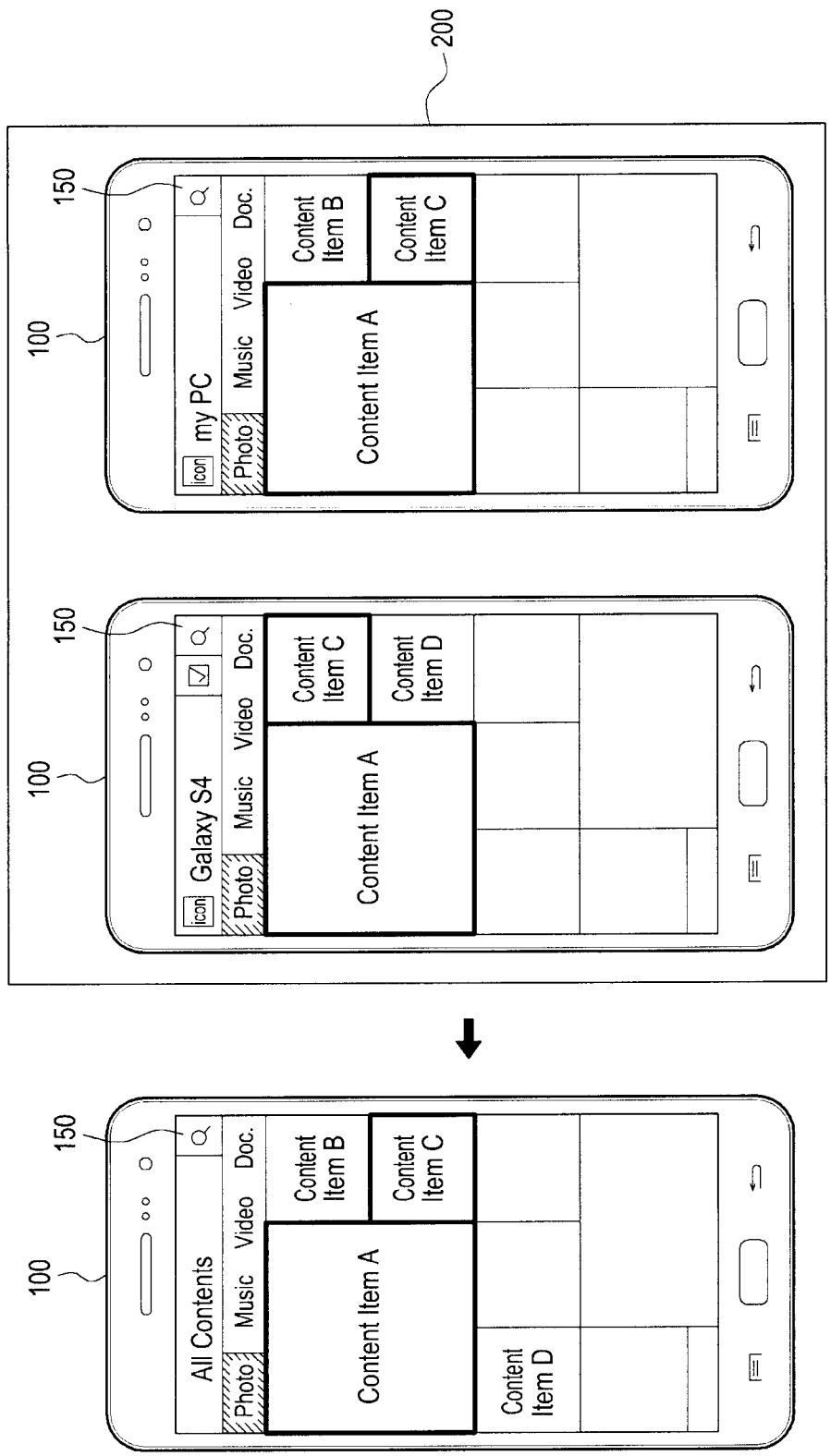
FIG. 7 is a working example of content being displayed on a portable terminal in accordance with aspects of the present disclosure.

After the portable terminal 100 searches for the content, it may identify whether a certain content item is distributed redundantly across the plurality of electronic devices such that there are a plurality of certain content items scattered across the devices. This operation may be performed by the controller 110 of the portable terminal 100. Without identifying redundantly distributed content items, the number of content items that are redundantly displayed may be large and may be burdensome to view and manage. Thus, these redundantly displayed items may remarkably diminish the user experience. Moreover, these redundant content items may unnecessarily occupy memory space and waste resources. Thus, in one example, when controller 110 identifies a content item that is distributed redundantly, a select one of the redundantly distributed content items may be displayed, as shown in FIG. 7.

As noted above, the electronic devices 200 of. FIG. 2 may include a smart phone 220 and a laptop computer 210. The smart phone 220 may include Content item A, Content item C, and Content item D as image content. The laptop computer 210 may include Content item A, Content item B, and Content item C as the same type of image content. Thus, in this example, Content item A and the Content item C are redundantly distributed across smart phone 220 and laptop computer 210. Referring to FIG. 7, a working example of displaying redundantly distributed content items is shown. In FIG. 7, portable terminal 100 may identify that Content item A and Content item C are redundantly distributed across smart phone 220 and a laptop computer 210. Portable terminal 100 may select one of the redundant content items (e.g., one content item A and one Content item C) to display based on predetermined criterion rather than displaying them repetitively. The predetermined criterion may include at least one of content name, content modification dates and times, and hash codes associated with the content items. The name of a certain content item may be designated by the user or may be a predefined file name. The modified date and time of the content item may mean date and time on which predetermined manipulation with respect to the content item occurs before a point-in-time at which the user desires to manipulate the content item. The manipulation may mean copy, modification, execution, and movement of the content item, but the meaning of manipulation is not limited thereto. The hash code of a certain content item may be a unique code associated with a content item for identifying the content item. These hash codes may be stored in a header field of the content item.

If redundantly distributed content items are identified based solely on identical names and identical modified date/time, the content may still not be identical. In this instance, a plurality of content items may be erroneously deemed redundant even if the content is not identical. For example, the content may inadvertently have the same name and modified date/time. Thus, for a plurality of certain content items, the hash codes associated with the content items may be compared. Therefore, if a plurality of content items have the same name and modified date/time but different hash codes, they may be considered to be different. Using these hash codes may improve the accuracy of redundant content identification. On the other hand, if the hash codes are identical but the names and modified date/times are different, the content item may be deemed redundantly distributed. The hash codes of a content item may be generated when the content item is generated and stored in a storage of portable terminal 100 or the electronic devices 200 and 300. In one example, the generated hash codes may be stored together with the content. The hash codes of the content may be generated by a controller (for example, a microprocessor) included in the portable terminal 100 or the electronic devices 200 and 300.

Referring back to FIG. 3, when a certain content item is distributed redundantly, portable terminal 100 may select and display one of the certain content items such that the select one of the certain content items is chosen in accordance with predetermined criteria, in operations S540 and S550. For example, in FIG. 7, portable terminal 100 may display a select one of content item A and content item C, even if content item A and content item C exist in two electronic devices (for example, Galaxy S4 and myPC). When no content item is redundantly distributed across the devices, portable terminal 100 may display the content items stored across the electronic devices 200, in operation S550.

Figure 8A:
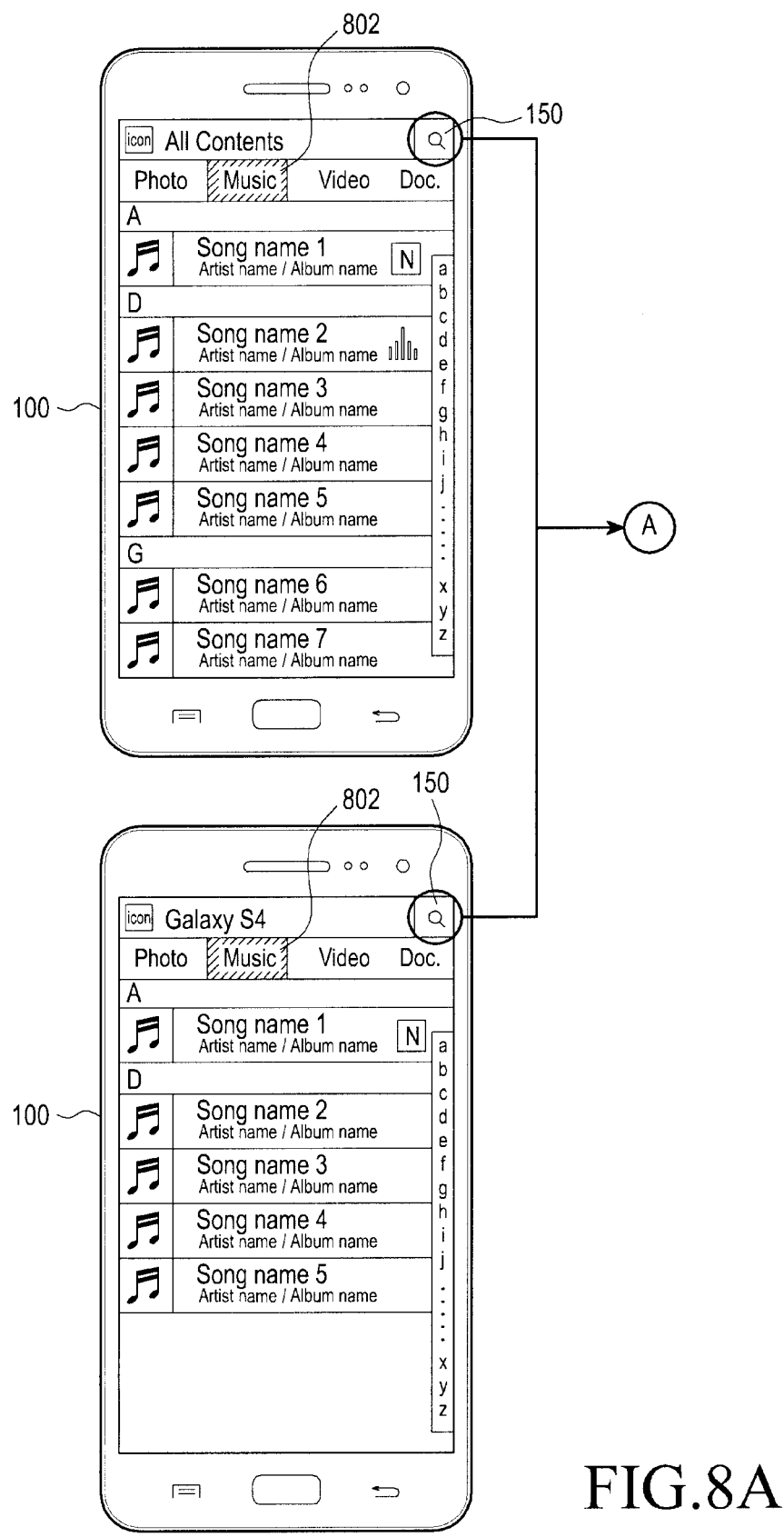
FIG. 8A and FIG. 8B are working examples of a portable terminal searching for content in accordance with aspects of the present disclosure.
Figure 8B:
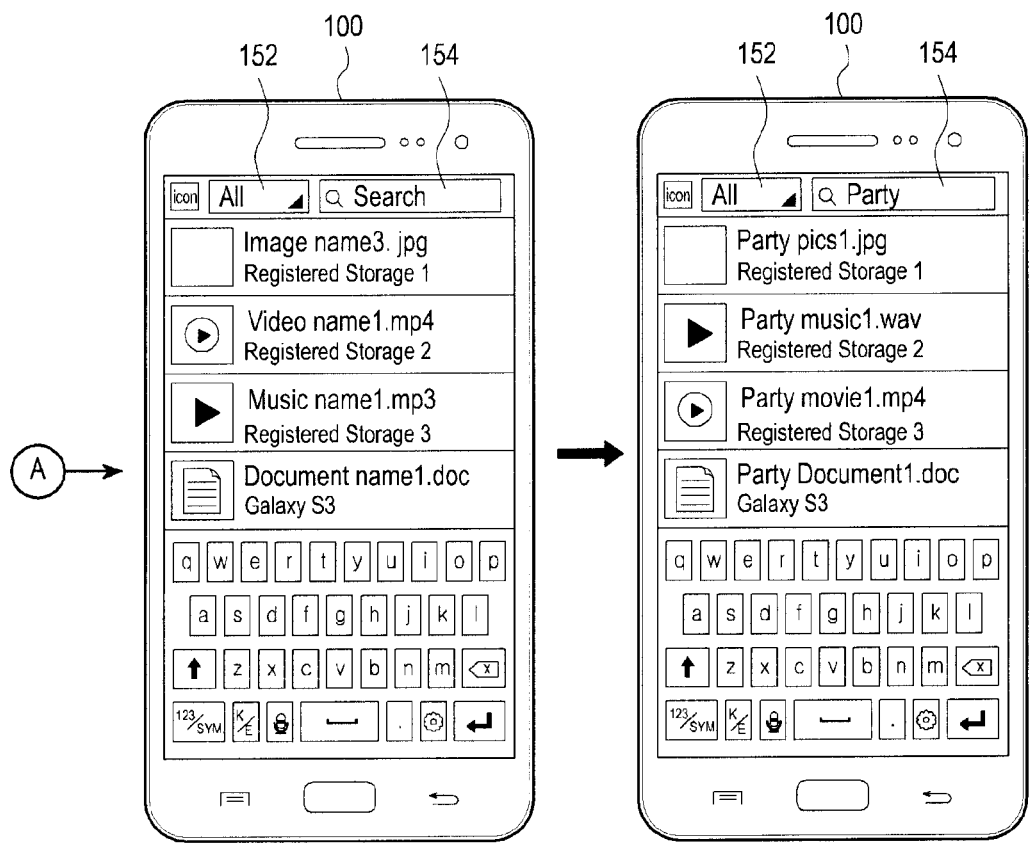
Figures 9A, 9B:
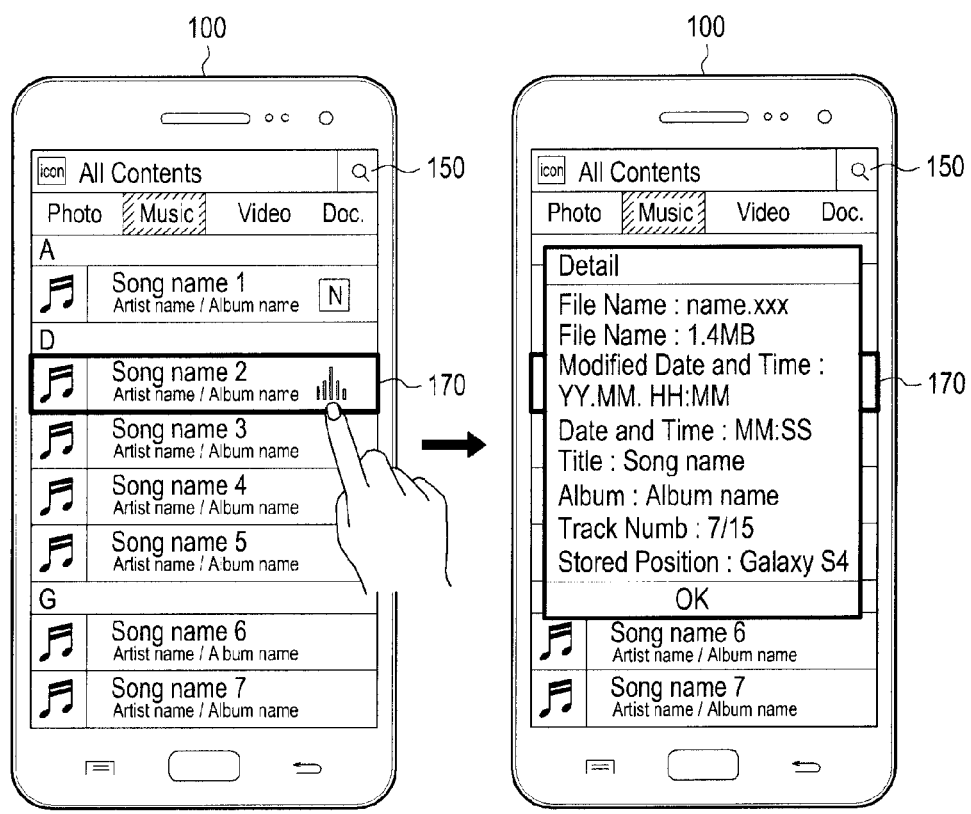
FIG. 9A and FIG. 9B are working examples of displaying content information in accordance with aspects of the present disclosure.

With regard to S550, displaying the content items stored across the electronic devices 200, may include displaying metadata associated with each content item and a thumbnail image associated with each content item received from the electronic devices 200 on touch screen 190. The metadata may comprise at least one of content name, volume, information regarding electronic devices in which each content item is stored, resolution, artist name, track number, modified dates and times, title, and playing times. The metadata may be displayed on the touch screen 190, for example, as shown in FIGS. 8A and 8B. In another example, as illustrated in FIGS. 9A and 9B, if a content item 170 is selected, for example, by a long touch gesture, the metadata may be displayed on a separate window as details of selected content item 170. This operation may be controlled by controller 110. The user may easily determine in which electronic device 200 the selected content item 170 is included.

In a further example, if the user executes selected content item 170, portable terminal 100 may receive selected content item 170 from the electronic device 200 and execute selected content item 170. Image content may be executed on the portable terminal 100 in a variety of ways depending on the content type. The downloaded content and other data associated with the content may be stored in storage 175. Execution of selected content item 170 may comprise displaying an image in the original image size (rather than the thumbnail image) and playing the content item via streaming (if the content is voice or audio) . . . . For document (text) content, execution of selected content item 170 may comprise displaying details of the content on the touch screen 190 of the portable terminal 100.

Figure 4:
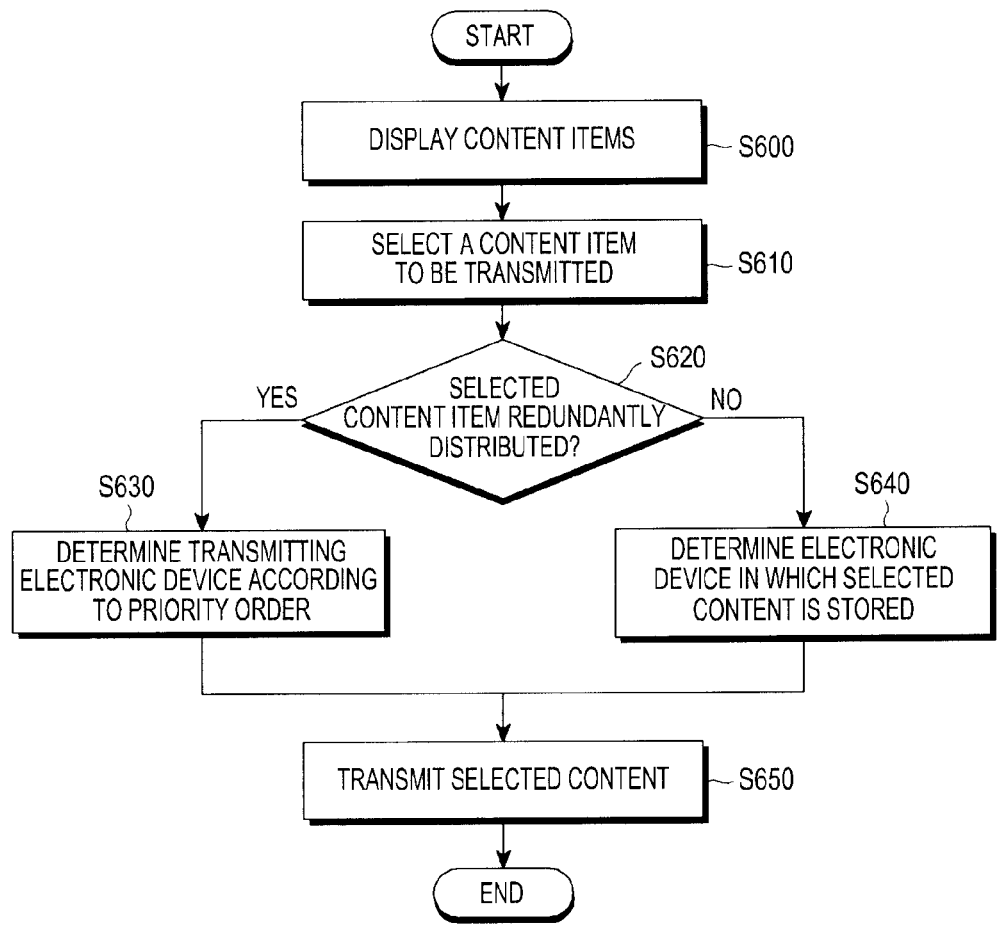
FIG. 4 is a flowchart illustrating an example method for transmitting content in a portable terminal in accordance with aspects of the present disclosure.

Referring now to FIG. 4, a flowchart illustrating an example method for transmitting content in portable terminal 100 is shown. Portable terminal 100 may display content items in operation S600, and the user may select content item 170 to be transmitted to at least one of the electronic devices 300 and 200 in operation S610. Controller 110 may detect selection of the content item on touch screen 190 of portable terminal 100.

The portable terminal 100 may identify whether selected content item 170 is redundantly distributed in operation S620. If selected content item 170 is redundantly distributed, a transmitting electronic device from which to transmit selected content item 170 is identified from among the plurality of electronic devices storing selected content item 170. In one example, the transmitting electronic device may be selected in accordance with a predetermined priority order. The priority order may be based on a network connection guarantee of the transmitting electronic device, a network type of the transmitting electronic device, an attribute of the electronic device receiving the selected content item, or a transmission interface type of the selected content item. The network connection guarantee of the transmitting electronic device may be defined as network availability or consistency. By way of example, portable terminal 100 may be capable of managing selected content item 170 regardless of the network connection, and thus may be defined to have a first priority. A cloud server 240 is not a client, but a server, and thus may be defined to have a second priority. The laptop computer 210 may have a stable network state when being turned ON, and thus may be defined to have a third priority. For the smart phone 220, network availability may be the most difficult to guarantee among the electronic devices 200, such that the smart phone 220 may have a fourth priority. However, it is understood that this is merely an example of the present disclosure and the priority order is not limited by this example. For the cloud server 240, a cloud server 244 included in the "Registered Storage" item may be defined to have a higher priority than a home cloud server 242 included in the "Registered User Device" item.

In another example, the priority order may be determined by the network type of the transmitting electronic device. As noted above, the network type may mean a communication standard, such as Wi-Fi. For example, for the same smart phone 220, its priority may be defined differently based on a network to which it's connected. If priorities among Wi-Fi, $4^{th}$ Generation (4G), and 3G are defined, Wi-Fi may have the highest priority, 4G (LTE or LTE-A) may have the next highest priority, and then 3G may have the lowest priority. This priority order may be determined based on network consistency, data rate, and whether payment is required for the network use.

In a further example, the priority order may be determined based on an attribute of the electronic device receiving selected content item 170. If the receiving electronic device is, for example, a TV, selected content item 170 may be transmitted from portable terminal 100 or smart phone 220, such that the portable terminal 100 or the smart phone 220 may function as a remote controller for the TV and thus the portable terminal 100 or the smart phone 220 may have a higher priority than another electronic device 200.

In still another example, the priority order may be determined based on a transmission interface type of selected content item 170. If the interface through which selected content item 170 is transmitted is, for example, a Social Network Service (SNS), portable terminal 100 or smart phone 220 may have the highest priority, in view of the availability of SNS. The portable terminal 100 may identify the transmitting electronic device in accordance with the above-described example priority order in operation S630, and may transmit selected content item 170 from the transmitting electronic device in operation S650. These operations may be performed by controller 110 and the sub-communication module 130. If the selected content 170 is not redundantly distributed (i.e., if the selected content is in only one device), the n the electronic device storing the selected content may be identified in operation S640 and transmitted therefrom in operation S650.

Once content is selected, the selected content may be executed, searched, deleted, or transmitted.

Figure 5:
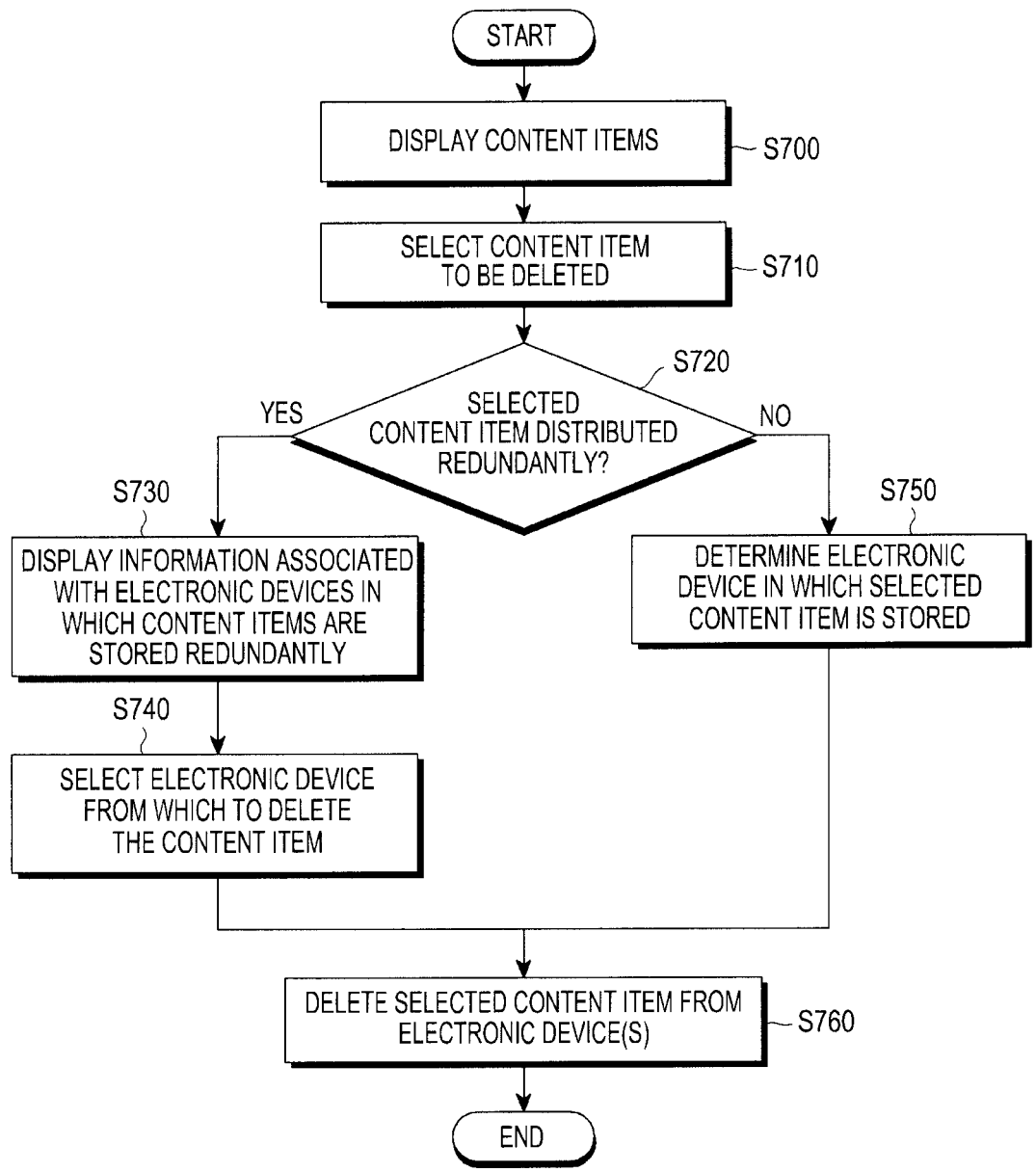
FIG. 5 is a flowchart illustrating a further example method for deleting content in a portable terminal in accordance with aspects of the present disclosure.

Referring now to FIG. 5, a flowchart illustrating an example method for deleting content items in portable terminal 100 is shown. Portable terminal 100 may display content items in operation S700, and the user may select a content item (e.g., selected content item 170) to be deleted in operation S710. Thus, the touch screen 190 of the portable terminal 100 may receive a user's selection input, and the controller 110 may detect selected content item 170 based on the selection input.

Figures 10A, 10B:
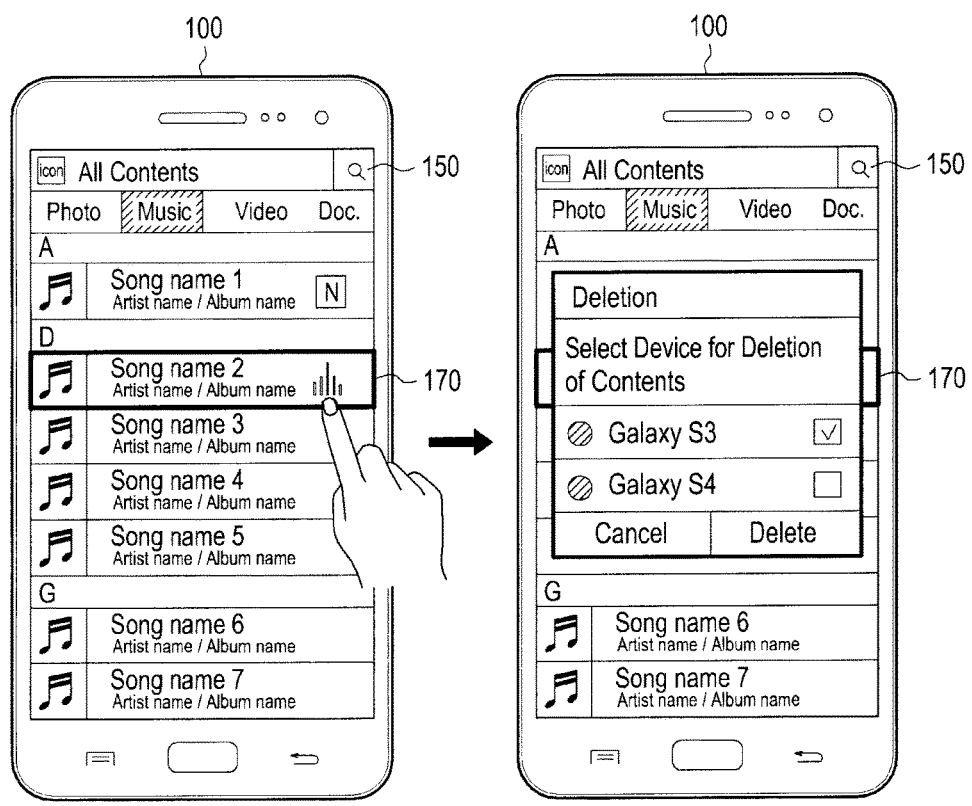
FIG. 10A and FIG. 10B are further working examples of identical content displayed in a portable terminal in accordance with aspects of the present disclosure.

The portable terminal 100 determines whether selected content item 170 is distributed redundantly in operation S720. If selected content item 170 is distributed redundantly, information associated with the electronic devices in which the content items are redundantly stored may be displayed in operation S730. Unlike the example in which selected content item 170 is being transmitted, no priority order may need to be determined for deletion of selected content item 170. For deletion of selected content item 170, controller 110 may allow a user to select from which device(s) to delete the content instead of arbitrarily deleting selected content item 170. That is, for deletion, a user's intention may be reflected to determine from which electronic device 200 the content are to be deleted. Thus, controller 110 may display information associated with the electronic devices in which the content item are redundantly stored. Referring now to FIGS. 10A and 10B, touch screen 190 may receive an input that selects the electronic device(s) from the user. By way of example, if selected content item 170 to be deleted is stored in smart phone 220 (for example, Galaxy S3 and Galaxy S4), information associated with the smart phone 220 may be displayed together with a deletion menu as illustrated in FIG. 10B. Although not shown in FIGS. 10A and 10B, a menu button of portable terminal 100 may be touched by the user, such that the user selects deletion of content in an environment setting menu displayed on portable terminal 100.

The user selects the electronic device 200 from which to delete the selected content item in operation S740, and controller 110 deletes the selected content 170 from the electronic device(s) in operation S760. If the selected content item 170 is not redundantly distributed, the one electronic device storing the selected content item 170 may be determined in operation S750. Determining which device stores the selected content item 170 may be carried out by controller 110 and sub-communication module 130. The selected content item 170 may be deleted from the electronic device in operation S760.

Referring now to FIGS. 8A and 8B, a working example of portable terminal 100 searching for content is shown. An upper portion 802 in FIG. 8A shows that music content is being displayed on the portable terminal 100 in this example. If search button 150 is selected, screen switchover may be performed to a screen for searching all content stored in the electronic devices 200 as illustrated in FIG. 8B. On the switched screen, the user may select the desired electronic device 200 through an electronic device selection button 152. If "Party" is input to a search window 154, content including a character string "Party" may be searched in the electronic devices 200 as illustrated in FIG. 8B. This operation may be performed by controller 110 and sub-communication module 130.

Although names and stored positions of the content items are displayed in FIG. 8B, it is understood that these are merely illustrative and that the present disclosure is not limited by these examples.

Referring now to FIGS. 11A to 11C, working examples of a screen on which content items may be executed are shown. FIG. 11A shows image content being executed. On a content execution screen, a device or storage name 180 may also be displayed as identification information of the electronic device 200, such that the user may easily recognize in which electronic device 200 the content being executed is stored. Likewise, as illustrated in FIGS. 11B and 11C, voice content or video content are being executed. The device or storage name 180 may also be displayed. Although not shown in FIGS. 11A to 11C, the device or storage name 180 may also be displayed when text (documents) is shown.

The examples herein may be implemented with hardware, software, or a combination of hardware and software. Such arbitrary software may be stored, whether or not erasable or re-recordable, in a volatile or non-volatile storage such as a Read-Only Memory (ROM); a memory such as a Random Access Memory (RAM), a memory chip, a device, or an integrated circuit; and an optically or magnetically recordable and non-transitory machine (e.g., computer)-readable storage medium such as a Compact Disc (CD), a Digital Versatile Disk (DVD), a magnetic disk, or a magnetic tape. It can be seen that a storing unit included in an electronic device is an example of a non-transitory machine-readable storage medium which is suitable for storing a program or programs including instructions for implementing the techniques disclosed herein. Therefore, the present disclosure includes a program including codes for implementing an apparatus or method claimed in an arbitrary claim and a non-transitory machine-readable storage medium for storing such a program. The program may be electronically transferred through an arbitrary medium such as a communication signal delivered through wired or wireless connection, and the present disclosure properly includes equivalents thereof. The user device may receive and store the program from a program providing device connected in a wired or wireless manner. The program providing device may include a memory for storing a program including instructions for instructing the user device to execute the preset method for conversion between audio and a text, a communication module for performing wired or wireless communication with the user device, and a controller for transmitting a corresponding program to the user device at the request of the user device or automatically.

In accordance with the present disclosure, content items stored in different electronic devices of the user may be integrally displayed and content items that are redundantly distributed across the electronic devices may be identified, such that the user may integrally and conveniently manage the content stored in various electronic devices.

Other effects that may be obtained or expected from the examples of the present disclosure are explicitly or implicitly disclosed in the detailed description. That is, various effects expected from the examples of the present disclosure have been disclosed in the detailed description of the present disclosure.

While the present disclosure has been particularly shown and described with reference to examples, various changes in form and detail may be made without departing from the spirit and scope of the present disclosure as defined by the following claims. Accordingly, the scope of the present disclosure will be defined by the appended claims and equivalents thereof.

No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

What is claimed is:

1. A method for integrally managing content in a terminal, the method comprising:
    displaying, by at least one processor of the terminal, information associated with a plurality of electronic devices registered under a user identifier on a touch screen of the terminal;
    searching, by the at least one processor, across the plurality of electronic devices for files with a search term;
    receiving, by the at least one processor, an identification of a plurality of files that are related to the search term, wherein the plurality of files comprise at least two files that are identical to each other, wherein the at least two files are identical to each other when the two files have identical content based hash codes, and wherein the at least two files are stored on at least two different ones of the plurality of electronic devices;
    identifying, by the at least one processor, which ones of the identified plurality of files are the at least two files that are identical to each other;
    selecting, by the at least one processor, one file of the at least two files that are identical to each other;
    in response to the selection, deleting, by the at least one processor, the other files of the at least two files except the selected one file, thereby resulting in a plurality of distinct files; and
    controlling, by the at least one processor, the touch screen to display a plurality of objects identifying corresponding ones of the plurality of distinct files, and
    selecting a transmitting electronic device for transmitting one file of the plurality of distinct files from among the terminal and the plurality of electronic device according to a predetermined priority order.

2. The method of claim 1, further comprising selecting the one file based on a predetermined criteria.

3. The method of claim 1, wherein identifying which ones of the plurality of files are the at least two files that are identical to each other further comprises generating a code for each of the plurality of files based on the contents of each of the plurality of files, and wherein the at least two files that are identical to each other have identical codes generated based on the contents of the at least two files.

4. The method of claim 1, further comprising searching for the plurality of electronic devices registered under the user identifier.

5. The method of claim 1, further comprising
    detecting selection of one object identifying the one file from among the displayed plurality of objects; and
    managing the one file.

6. The method of claim 5, wherein managing the one file comprises at least one of:
    executing the one file;
    searching for the one file across the plurality of devices;
    deleting the one file; and
    transmitting the one file.

7. The method of claim 6, further comprising identifying an electronic device from the plurality of electronic devices from which to delete the one file.

8. The method of claim 7, wherein identifying the electronic device from which to delete the one file comprises:
    displaying electronic devices that store the one file; and
    detecting selection of the electronic device from which to delete the one file from among the displayed electronic devices that store the one file.

9. The method of claim 6, further comprising displaying information associated with electronic devices in which the one file is stored, when the one file is executed.

10. The method of claim 1, wherein the priority order is based on a network connection guarantee of the transmitting electronic device, a network type of the transmitting electronic device, an attribute of a receiving electronic device to receive the one file, or a transmission interface type of the one file.

11. The method of claim 1, wherein displaying the plurality of objects identifying corresponding ones of the plurality of distinct files comprises displaying metadata associated with each of the plurality of distinct files and a thumbnail image associated with each of the plurality of distinct files.

12. The method of claim 11, wherein the metadata comprises at least one of content name, volume, information regarding electronic devices in which each of the plurality of distinct files is stored, resolution, artist name, track number, modified dates and times, title, and playing times.

13. The method of claim 1, wherein each of the plurality of files comprises at least one of an image file, a video file, a voice file, and a text file.

14. The method of claim 1, wherein displaying objects identifying the corresponding ones of the plurality of distinct files comprises displaying metadata associated with each searched electronic device.

15. A terminal for integrally managing content, the terminal comprising:
at least one processor configured to:
display, on a touch screen, information associated with a plurality of electronic devices registered under a user identifier;
search across the plurality of electronic devices for files with a search term;
receive an identification of a plurality of files that are related to the search term, wherein the plurality of files comprise at least two files that are identical to each other, wherein the at least two files are identical to each other when the two files have identical content based hash codes, and wherein the at least two files are stored on at least two different ones of the plurality of electronic devices;
identify which ones of the identified plurality of files are the at least two files that are identical to each other;
select one file of the at least two files that are identical to each other;
in response to the selection, delete the other files of the at least two files except the selected one file, responsive to selecting, thereby resulting in a plurality of distinct files;
display a plurality of objects identifying corresponding ones of the plurality of distinct files; and
selecting a transmitting electronic device for transmitting one file of the plurality of distinct files among the terminal and the plurality of electronic device according to a predetermined priority order.

16. The terminal of claim 15, wherein the at least one processor is further configured to select the selected one file based in accordance with a predetermined criteria.

17. The terminal of claim 15, wherein the at least one processor is further configured to identify the which ones of the plurality of files are the at least two files that are -identical to each other by comparing codes of each of the plurality files that are generated based on the content of each of the plurality of files, wherein the at least two file that are identical to each other have identical codes.

18. The terminal of claim 15, wherein the at least one processor is further configured to search the plurality of electronic devices registered under the user identifier.

19. The terminal of claim 15, wherein the at least one processor is further configured to:
detect selection of one object identifying the one file from among the plurality of objects displayed on the touch screen; and
manage the one file.

20. The terminal of claim 19, wherein when managing the one file, the at least one processor is further configured to perform at least one of:
executing the one file;
searching for the one file across the plurality of devices;
deleting the one file; and
transmitting the one file.

21. The terminal of claim 20, wherein the at least one processor is further configured to identify an electronic device from the plurality of electronic devices from which to delete the one file.

22. The terminal of claim 21, wherein the at least one processor is further configured to:
display electronic devices that store the one file; and
detect selection of the electronic device from which to delete the one file from among the displayed electronic devices that store the one file.

23. The terminal of claim 21, wherein the at least one processor is further configured to display information associated with electronic devices in which one file is stored, when the one file is executed.

24. The terminal of claim 15, wherein the priority order is based on a network connection guarantee of the transmitting electronic device, a network type of the transmitting electronic device, an attribute of a receiving electronic device to receive the one file, or a transmission interface type of the one file.

25. The terminal of claim 15, wherein the at least one processor is further configured to display metadata associated with each of the plurality of distinct files and a thumbnail image associated each of the plurality of distinct files.

26. The terminal of claim 25, wherein the metadata comprises at least one of content name, volume, information regarding electronic devices in which each of the plurality of unique files, resolution, artist name, track number, modified dates and times, title, and playing times.

27. The terminal of claim 15, wherein each of the plurality of files comprises at least one of an image file, a video file, a voice file, and a text file.

28. The terminal of claim 15, wherein the at least one processor is configured to display metadata associated with each searched electronic device.

* * * * *